Aug. 7, 1934.   J. P. EASTMAN   1,969,548
HOSE CLAMP OR CONNECTION AND METHOD OF CLAMPING THE END OF A HOSE
Filed Sept. 24, 1930   3 Sheets-Sheet 1
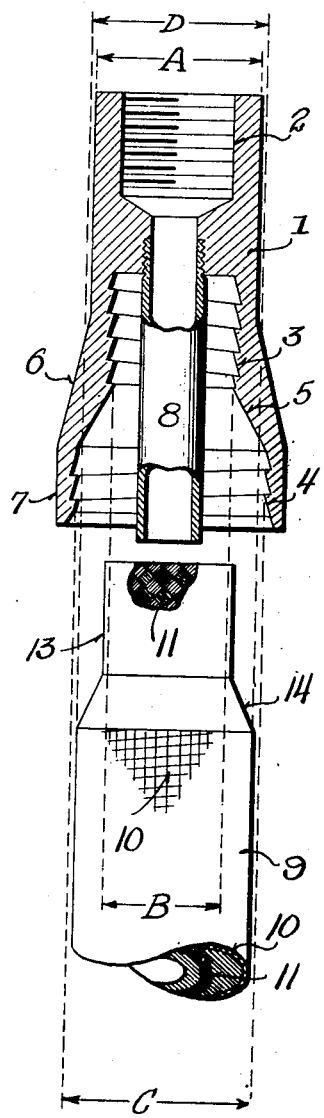
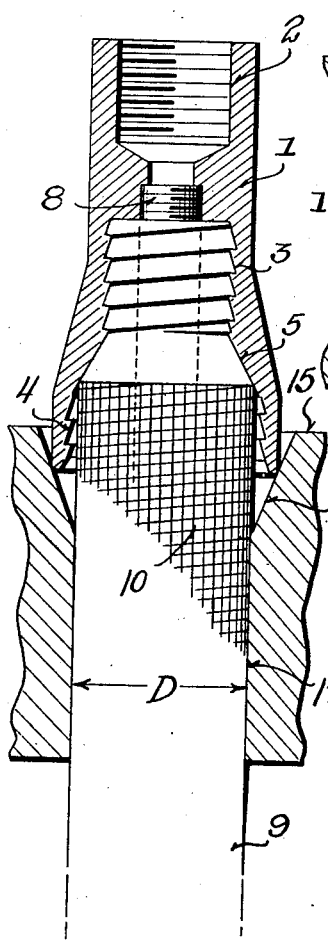
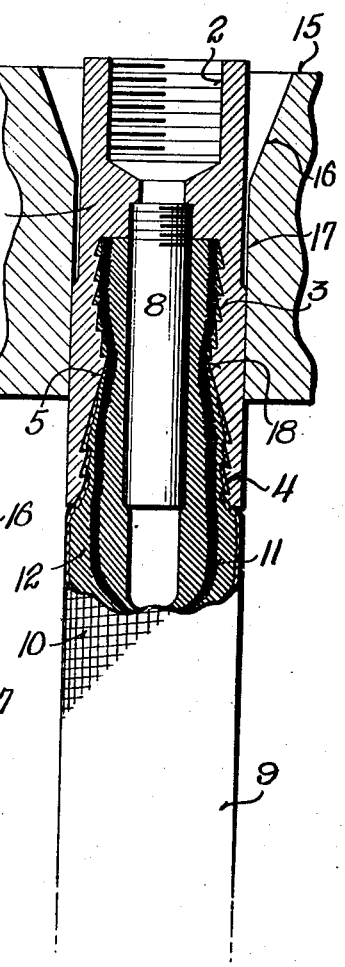
Inventor
Joseph P. Eastman
By Arthur R. Woolfolk
Attorney Aug. 7, 1934.   J. P. EASTMAN   1,969,548
HOSE CLAMP OR CONNECTION AND METHOD OF CLAMPING THE END OF A HOSE
Filed Sept. 24, 1930   3 Sheets-Sheet 2
Fig. 4
Fig. 5
Fig. 6
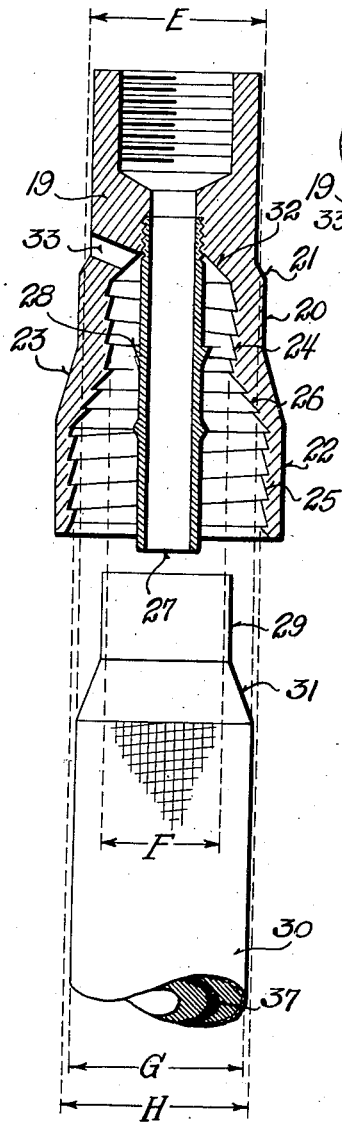
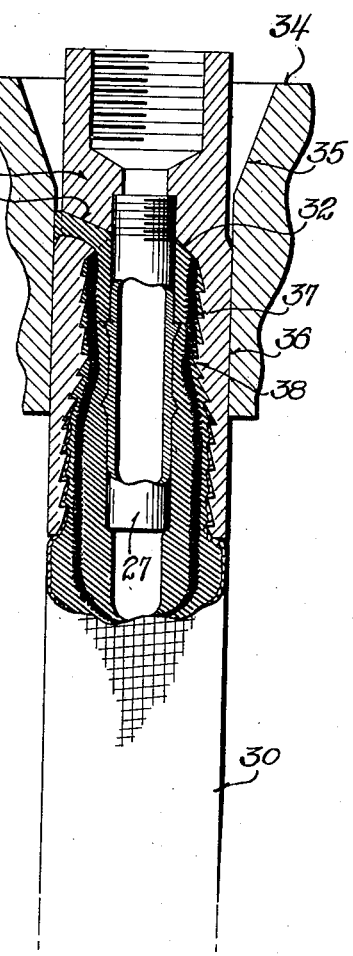
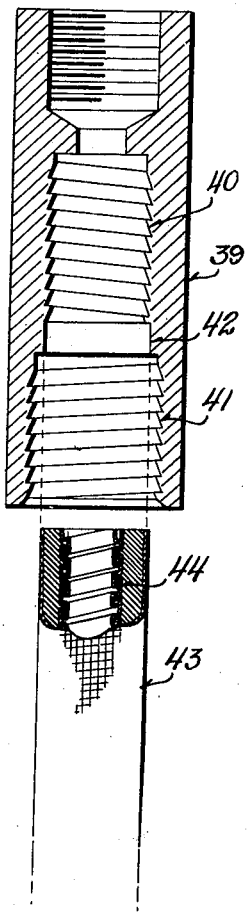
Inventor
Joseph P. Eastman
By Arthur R. Woolfolk
Attorney Aug. 7, 1934.　　　　　J. P. EASTMAN　　　　　1,969,548
HOSE CLAMP OR CONNECTION AND METHOD OF CLAMPING THE END OF A HOSE
Filed Sept. 24, 1930　　　3 Sheets-Sheet 3

Inventor
Joseph P. Eastman
By Arthur R. Woolfolk
Attorney

Patented Aug. 7, 1934

1,969,548

UNITED STATES PATENT OFFICE 1,969,548

HOSE CLAMP OR CONNECTION AND METHOD OF CLAMPING THE END OF A HOSE

Joseph P. Eastman, Manitowoc, Wis.

Application September 24, 1930, Serial No. 484,046

REISSUED

5 Claims. (Cl. 285—84)

This invention relates to hose clamps or connections and to the method of clamping the end of a hose.

Objects of this invention are to provide a connection for a hose which will not blow off, even under high pressure, and which will not permit leakage.

Further objects are to provide a connection which secures two grips upon the end of the hose, one grip engaging the strongest portion of the hose, and the other grip engaging the outer portion of the hose.

More specifically, objects of this invention are to provide a novel means of securing a connection to the end of a hose provided with a wire shell, forming an internal reinforcement, in such a manner that the connection grips the wire shell as well as the hose body and thus secures the utmost strength of grip, thereby permitting the hose to be used safely with very high internal pressures without danger of blowing off the connection or of causing a leak to form adjacent the connection.

Further objects are to provide a novel method of securing a connection to the end of a hose provided with a reinforcing shell, such method contemplating not only gripping the hose body but also providing a way of gripping the reinforcing shell, and further providing a means for forming an internal neck ring which tightly grips the reinforcing shell of the hose.

Further objects are to provide a novel way of preparing the end of a hose having an intermediate reinforcing shell so that the reinforcing shell may be engaged by a surrounding fitting placed over the end of the hose.

Further objects are to provide a novel form of hose connection and a method of forming the same which, when applied, has an internal neck ring formed by the connection and produced by forcing the connection endwise through a die.

A further object is to provide a hose connection which has a flare, taper, or enlargement intermediate its ends which may be external or internal or both, and which when the connection is applied to a hose and clamped in place, may be utilized to form an internal ring or neck ring.

Further objects are to provide a hose connection which has an upper flare which provides a construction that avoids any danger of breaking or shearing during contraction, and permits the contraction to extend upwardly as close to the end of the coupling as desired.

Further objects are to provide a hose connection that is so constructed that the excess material of the hose is allowed to escape, and which will compensate for any slight differences that may exist during manufacture.

Embodiments of the invention are shown in the accompanying drawings, in which:

Figure 1 is a view showing the connection and prepared hose about to be assembled, such view showing the connection partly in section.

Figure 2 is a view corresponding to Figure 1 showing the hose assembled within the connection and showing the parts in position to be pressed through the die.

Figure 3 is a view corresponding to Figure 2 showing the parts after contraction with the connection still in the die.

Figure 4 is a view corresponding to Figure 1 showing a further form of the invention, such view showing the connection in section and the prepared hose about to be assembled on the connection.

Figure 5 is a view corresponding to Figure 4 showing the connection contracted with the parts still within the die.

Figure 6 is a view of a further form showing a different type of connection and a different type of hose which may be used therewith.

Figure 7:
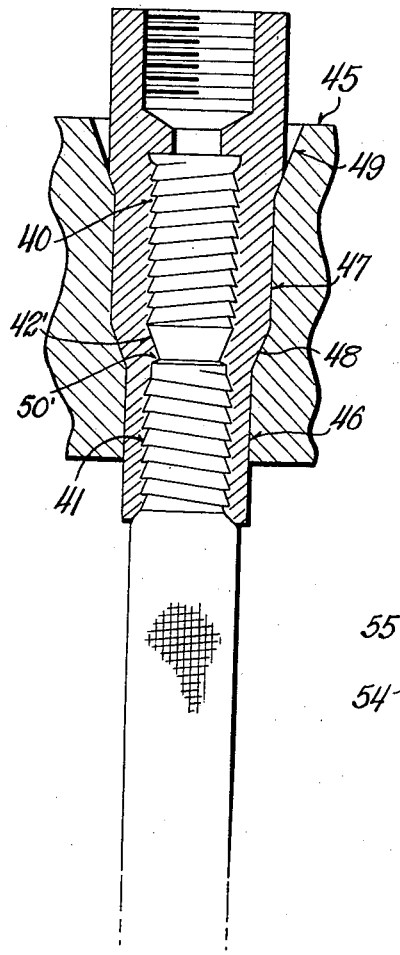
Figure 7 shows the form of Figure 6 after contraction and while the parts are still in the die.

In the description and in the claims the different parts of the connection will be referred to as the upper, middle, and lower parts. The drawings show the connection in a vertical position to correspond to this terminology, but it is to be distinctly understood that this terminology is used solely to secure clearness and precision in defining the parts, as it is obvious that the connection is used in horizontal, vertical, or inverted positions.

Referring to Figures 1, 2, and 3, it will be seen that the connection comprises a metal sleeve or member which has a head or body portion 1 which may be provided with male or female portions, a female threaded portion 2 being shown by way of illustration. The body portion 1 is preferably of a diameter indicated by the reference character A in Figure 1. This body portion 1 will be referred to as the upper portion. The connection extends downwardly and is bored out to a diameter indicated by the reference character B and is provided with right hand threads. This threaded upper bore is indicated by the reference character 3.

The connection is provided with a lower bore 4 which is provided preferably with left hand threads and is of a diameter indicated by the reference character C in Figure 1. The lower bore, it will be noted from Figure 1, is of a larger diameter than the upper bore 3. The two bores are joined by a conical portion or internal flare 5.

The outer portion of the connection is provided with an intermediate or mid-flare 6. It is to be noted that the conical inner bore 5 and the outer tapered portion 6 are not parallel, as shown in the form illustrated in Figures 1 and 3, although it is obvious that they could be made parallel without departing from the invention in its broadest aspects. However, it is preferable to form them as indicated in Figure 1, so that a somewhat triangular cross section of metal is provided at this point. The lower portion of the connection is provided with a cylindrical outer surface 7, as may be most clearly seen in Figures 1 and 2.

The connection is provided with a tubular central insert 8 which is preferably screw threaded into the upper portion or body portion, as shown. This tubular insert may be approximately or slightly greater than the internal diameter of the hose.

The hose 9 is preferably of the high pressure type and preferably is provided with a woven outer covering indicated at 10 in Figure 1. It is also provided with a braided wire reinforcing portion 11, which is most clearly shown in the sectional portions of the hose in Figures 1 and 3. In the construction of these hoses, a rubber body portion 12 encloses the reinforcing metallic braided wires 11, as shown in Figure 3, and the cotton or other outer fabric covering completely surrounds the body portion of the hose.

In practicing this invention, the hose is stepped or, in other words, provided with a reduced end 13, cylindrical in contour and of a material length. It is preferable to provide a tapered or conical or beveled portion 14 which joins the two cylindrical portions 9 and 13 of the hose.

One way in which the stepped end of the hose may be formed is as follows:—The end of the hose is placed upon a mandrel and is ground down to form the cylindrical reduced portion or stepped portion 13 and the beveled or conical portion 14. This method of forming the end of the hose has been found to provide the utmost accuracy in properly shaping the hose. It is to be noted from Figure 1 that the external diameter of the portion 13 is slightly greater than the bore B and that a small film of rubber is left over the braided reinforcing wires 11. It is also to be noted that the fabric covering or other reinforcing outer covering 10 extends up to the edge of the beveled portion 14.

It is, of course, within the province of this invention to provide additional reinforcing means in the hose, for instance, cotton braiding may supplement the wire braiding 11, if desired. It is, of course, within the province of this invention to omit the fabric outer covering 10, if desired.

After the hose has been prepared, as described above, it is next assembled, as shown in Figure 2, by forcing the hose into the connection. It is preferable to provide a clamp, not shown, for the hose so as to aid in its rotation as it fits tightly within the upper bore 3 of the connection. It is actually screwed into place until it occupies the position shown in Figure 2. It is to be noted that the lower bore 4, which is provided with threads reversely arranged to the threads of the upper bore, is of such a diameter, as indicated by the reference character C, that it is greater than the outer diameter A of the hose, and consequently the hose does not touch the threads of the lower bore 4 during this assembling or inserting of the hose.

The diameter D of the die is indicated in both Figures 1 and 2, and it will be seen that such diameter is greater than the diameter of the upper end of the fitting or connection.

After the parts are assembled, as indicated in Figure 2, the hose is passed through the die 15, see Figure 2, with the lower end of the connection engaging the slanting portion or conical portion 16 of the die. The lower portion of the die is cylindrical as indicated at 17. This die may be a split die or a one-piece die, as desired, or as found most expedient.

When the parts are in the position shown in Figure 2, the connection is forced downwardly through the die. The parts may be pressed or forced completely through the die, if desired, and this is the preferred practice, that is to say, forcing them completely through the die.

From Figure 3 it will be seen that the upper end or body portion 1 of the connection is not contracted in this form of the invention, and also, it will be seen that this portion clears the die.

During the contracting operation the triangular portion formed between the conical inner bore 5 and the conical outer surface 6 moves inwardly and forms an inwardly extending ring or neck ring, as indicated at 18, which forms a contracted portion internally of the connection. The connection slightly elongates during this process. The teeth of the upper bore 3 bite into the braided wire reinforcing intermediate sheath 11, thereby securing a very firm grip on this braided wire reinforcing sheath. The neck ring binds more tightly than the other portion of the teeth in the upper bore, as shown in Figure 3, and forms a contracted portion. The lower portion 7 is contracted and thus firmly binds the body portion of the hose, and if the hose is covered with a fabric sheath of woven material or other similar material, it securely anchors this outer sheath of the hose and thus, by gripping the outer covering, prevents the likelihood of the breaking of the hose at this point.

However, it is to be noted particularly that by means of this invention the reinforcing, braided wires are firmly engaged by the coupling, and as these wires furnish the major strength of the hose, it is apparent that the maximum grip upon the firmest portion of the hose is secured by this construction.

It is to be noted, also, that the contraction starts at the lower end of the connection and thus prevents the flowing of the rubber outwardly from the connection.

In the form of the invention shown in Figures 4 and 5, the same inventive idea is followed. However, in this form of the invention the connection comprises an upper or body portion 19 which is of slightly less diameter than the intermediate, cylindrical portion 20. Preferably these parts are connected by a slight bevel 21, as shown. The lower portion of the connection is provided with an enlarged cylindrical part or lower member 22, and a beveled or conical surface 23 joins the cylindrical parts 20 and 22, as shown.

This connection is provided with an upper bore 24 which is equipped with right hand threads forming teeth, as indicated, and with a lower, larger bore 25 provided with left hand threads forming teeth, as shown in Figure 4. These two bores are joined by a conical portion 26 which is provided with annular rings forming teeth, although, obviously, this portion could be threaded without departing from the spirit of the invention. The annular rings, however, are preferred.

It is to be noted that the construction thus far given is very similar to that shown in Figure 1. However, the diameter of the intermediate portion 20 is slightly larger than the diameter of the die which, for convenience, is indicated at E in Figure 4. The connection is provided with a tubular, centrally arranged insert 27, as previously described. If desired, this insert may be provided with barbs or rings, as indicated by the reference character 28, although the insert could be made smooth without departing from the spirit of this invention.

The hose is stepped, as previously described, to provide a reduced, cylindrical end 29 of material length which is preferably connected with the cylindrical body portion 30 of the hose by means of the tapered portion 31, as previously described.

The invention, however, shown in Figures 4 and 5, differs from that previously described in other particulars. For example, the upper end of the upper bore 24 is provided with a conical portion or upper flare 32 and the body portion of the connection is provided with an overflow hole 33 for the displaced rubber, which will be hereinafter described.

The parts are assembled, as previously described. It is to be noted that the diameter of the cylindrical, reduced portion 29 of the hose is greater than the internal diameter F of the upper bore 24, as indicated in Figure 4. Further, the diameter G of the hose is less than the diameter H of the lower bore 25 of the connection.

After the parts are assembled, as previously described in connection with Figures 1 to 3, the connection is forced through the die 34, such die being provided with a conical portion 35 and a cylindrical portion 36, as previously described.

During the contracting operation any displaced rubber can find its way into the conical recess 32 and any excess rubber can be discharged through the opening 33.

During the contracting operation it is also to be noted that the intermediate portion 20 of the connection is contracted as well as the lower portion 22. The conical bore or portion 32 prevents shearing of the material and permits the upper portion to be contracted without excessive stresses being imposed upon the metal. This contraction of the upper portion forces the teeth into engagement with the wire braiding 37 of the hose and also forms a neck ring or more greatly contracted portion, indicated generally at 38, which also firmly engages the braided wires.

In the form of the invention shown in Figures 6 and 7, a different type of connection and a different type of hose are employed. This connection is a cylindrical member, as indicated at 39, and is provided with an upper bore 40 which is equipped with left hand threads and a lower, enlarged bore 41 which is equipped with right hand threads, thus providing teeth, as previously described. It is preferable to provide an intermediate bore 42 free from teeth and of a size approximately that of the outer diameter of the hose 43. This hose 43 is of greater diameter than the diameter of the upper bore 40, as shown in Figure 6, and it is preferable to use a hose provided with a metal core 44, so that this core acts somewhat like the insert of the previously described forms and prevents collapsing of the hose. It is obvious, however, that an insert could be used with the connection shown in Figure 6 and a different type of hose could be employed, if so desired.

With this form of the invention the die takes a different shape from that previously described. The die is indicated in Figure 7 by the reference character 45, and it is provided with a lower cylindrical portion 46 joining an upper cylindrical portion 47 of larger diameter by means of a beveled portion 48. The upper portion of the die is beveled, as indicated at 49. In this case the connection is not pressed completely through the die. It is pressed into the position shown so that the contraction stops short of the upper end of the upper bore 40. The intermediate portion 42 stops at approximately the beveled portion 48 of the die and is contracted, as shown by the reference character 42' in Figure 7. This contracting of the intermediate portion rocks the lower corners inwardly and forms a neck ring 50' which extends inwardly a greater distance than any other portion of the connection.

Figure 8:
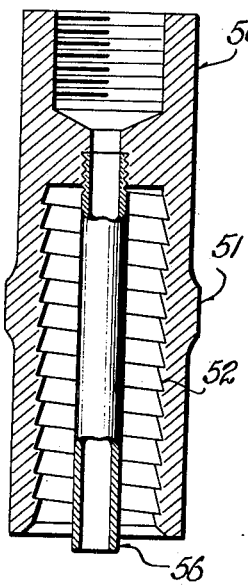
Figure 8 is a view of a still further form of connection showing the hose about to be assembled thereon.
Figure 9:
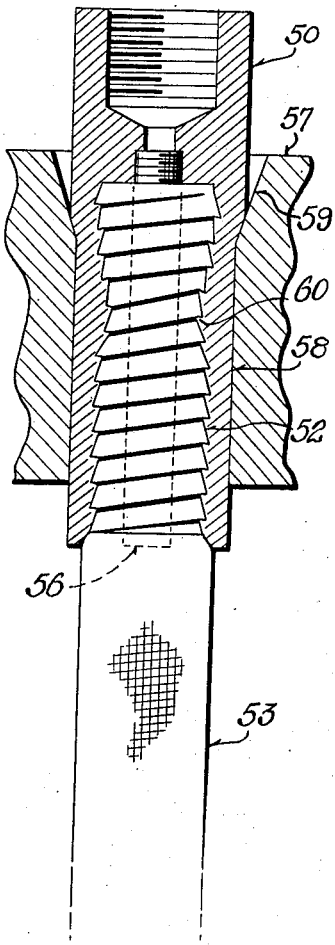
Figure 9 is a view corresponding to Figure 8 showing the parts after contraction and while the connection is still within the die.

It is obvious that other means could be employed for forming this neck ring. For example, as shown in Figures 8 and 9, the connection may consist of a member 50 which is cylindrical throughout its major portion, but which is provided with an enlarged annular intermediate part 51. The internal bore of the connection is of uniform diameter throughout, as indicated at 52, and is provided with threads which form teeth, as previously described. The bore is of lesser diameter than the external diameter of the hose 53, such hose being either plain or provided with a fabric woven outer sheath 54 and being provided with a braided wire intermediate sheath 55.

The connection is provided with a centrally arranged, tubular insert 56 as previously described.

The hose is assembled, as has been previously stated, by screwing it into place. Thereafter the connection is forced into a die 57, see Figure 9, which is provided with a cylindrical portion 58 and a conical upper portion 59. The contraction stops below the upper end of the inner bore 52, as shown in Figure 9. The annular enlargement 51 is forced inwardly, thereby forcing the metal of the connection inwardly and forming a neck ring or contracted ring indicated generally at 60.

It is to be distinctly understood that the parts of the different types of connections may be interchanged as desired, that the threads may be single or double, that the intermediate portions as shown in Figures 1 and 6 may be provided with annular rings cut therein or as previously described, and that other changes could be made from the precise disclosure in the drawings without departing from the spirit of this invention.

It is to be distinctly noted that although the conical connecting portion between the reduced cylindrical end and the body portion of the hose is preferred, that nevertheless this conical portion could be omitted and a more or less abrupt shoulder formed at this point. The corresponding connections would, of course, be similarly changed.

This connection and the stepped hose are intended primarily for high pressure, and it will be seen that the hose is very firmly secured to the connection and that there is substantially no chance of the hose blowing from the connection or of a leak occurring.

It is to be particularly noted that by stepping the hose as indicated, the braided reinforcing wires are actually gripped by the internal teeth of the connection and thus an extremely strong grip is secured.

While it is preferred to use a metal insert carried by the connection itself, it is nevertheless to be understood that the metal core within the hose, if sufficiently strong, can be looked upon as an insert to prevent collapse of the hose from the contraction of the connection.

It will be seen further that this invention provides a connection for hose which will not blow off and which will not permit leakage even under the strain of high internal pressure.

It is also to be noted that this invention is particularly applicable to hose in which braided wire supplies the chief strength; and this invention provides means for getting, in effect, two grips or what may be described as a two-step grip on the hose—one grip directly on the wires below the outer surface of the hose and the other grip upon the outer surface.

It is to be distinctly understood that the reinforcing sheath may be single or it may be double as shown in the drawings.

Although the invention has been described in considerable detail, it is to be understood that such description is intended as illustrative rather than limiting, as the invention may be variously embodied and is to be interpreted as claimed.

I claim:—

1. A hose connection comprising a hose end, a shell contracted upon and fitting around said end, and an inward ring formed on the inside of said shell and bedded into the substance of said hose, said shell being, after contraction, cylindrical externally and being of the same external diameter throughout the entire external area adjacent said inward ring.

2. A hose connection comprising a body portion having a sleeve projecting therefrom, said sleeve having an upper bore and a lower bore of different diameters, and said body portion having a conical recess joining the upper end of the upper bore, said conical recess forming an overflow space for the material of the hose, and acting as a stop for the end of the hose.

3. A connection for a hose end, said connection comprising a body portion and a sleeve projecting therefrom and adapted to be contracted upon the end of a hose, said connection having an overflow hole for the surplus material of the hose during contraction.

4. A hose clamp comprising an end wall and a sleeve projecting therefrom, said sleeve being adapted to receive the end of a hose and to be contracted to grip the same, said sleeve, having in the course of its length a portion which forms a ring substantially triangular in section, having two internal annular faces and one external annular face, said two inward faces being, before contraction, one of them generally cylindrical and the other non-cylindrical, and being, after contraction, both substantially conical, meeting in an inwardly projecting annular ridge, which bites into the substance of the hose.

5. A hose clamp comprising an end wall and a sleeve projecting therefrom, said sleeve being adapted to receive the end of a hose and to be contracted to grip the same, said sleeve, before contraction, comprising, externally, two portions of different diameters joined by an externally tapered portion, and, internally, two bores of different internal diameters, joined by an internally tapered portion, said internal taper being steeper than said external taper, whereby a ring substantially triangular in section is formed in the course of the length of said sleeve after said sleeve has been contracted.

JOSEPH P. EASTMAN.